US008448127B2

United States Patent
Lindley et al.

(10) Patent No.: US 8,448,127 B2
(45) Date of Patent: May 21, 2013

(54) SOFTWARE FORECASTING SYSTEM

(75) Inventors: Joe H. Lindley, Garland, TX (US); Gary D. Thomas, Richardson, TX (US)

(73) Assignee: Raytheon Company, Waltham, MA (US)

( * ) Notice: Subject to any disclaimer, the term of this patent is extended or adjusted under 35 U.S.C. 154(b) by 944 days.

(21) Appl. No.: 12/363,417

(22) Filed: Jan. 30, 2009

(65) Prior Publication Data

US 2010/0199258 A1 Aug. 5, 2010

(51) Int. Cl.
*G06F 9/44* (2006.01)

(52) U.S. Cl.
USPC .......... 717/101; 717/102; 717/104; 705/7.12; 705/7.26; 705/7.27; 705/7.28

(58) Field of Classification Search
USPC ................. 717/120–124, 101–104; 705/7.12, 705/7.26–7.28
See application file for complete search history.

(56) References Cited

U.S. PATENT DOCUMENTS

| | | | | |
|---|---|---|---|---|
| 6,073,107 | A * | 6/2000 | Minkiewicz et al. | 705/7.17 |
| 6,256,773 | B1 * | 7/2001 | Bowman-Amuah | 717/121 |
| 6,519,763 | B1 * | 2/2003 | Kaufer et al. | 717/101 |
| 7,110,956 | B1 * | 9/2006 | Drake et al. | 705/7.37 |
| 2003/0188290 | A1 * | 10/2003 | Corral | 717/101 |
| 2004/0073477 | A1 * | 4/2004 | Heyns et al. | 705/10 |
| 2006/0041857 | A1 * | 2/2006 | Huang et al. | 717/104 |
| 2007/0005618 | A1 * | 1/2007 | Ivanov et al. | 707/100 |
| 2007/0022142 | A1 * | 1/2007 | Palmer et al. | 707/200 |
| 2008/0034347 | A1 * | 2/2008 | V et al. | 717/101 |
| 2008/0235067 | A1 * | 9/2008 | George | 705/7 |
| 2009/0171820 | A1 * | 7/2009 | Ahluwalia et al. | 705/30 |
| 2009/0313605 | A1 * | 12/2009 | Ostrand et al. | 717/124 |

OTHER PUBLICATIONS

Lazic et al., Cost Effective Software Test Metrics, Issue 6, vol. 7, Jun. 2008.*
Marek Leszak, Software Defect Analysis of a Multi-release Telecommunications System, 2005.*
Ostrand et al., A Tool for Mining Defect-Tracking Systems to Predict Fault-Prone Files, 1998.*
U.S. Appl. No. 11/624,438, entitled "Method and System for Generating a Predictive Analysis of the Performance of Peer Reviews,"; (35 pages).
U.S. Appl. No. 12/354,605, entitled "Software Defect Forecasting System,"; (28 pages).

* cited by examiner

*Primary Examiner* — Lewis A Bullock, Jr.
*Assistant Examiner* — Tina Huynh
(74) *Attorney, Agent, or Firm* — Cantor Colburn LLP

(57) ABSTRACT

According to one embodiment, a software forecasting system includes a software forecasting tool coupled to a user interface and a software cost estimation tool. The software forecasting tool generates a software development metric according to attributes derived from one or more previous software development projects. The software forecasting tool receives a similar software development metric from the software cost estimation tool and calculates a difference between the received metric and that of its own and displays the result on the user interface.

17 Claims, 2 Drawing Sheets

SOFTWARE FORECASTING SYSTEM

TECHNICAL FIELD OF THE DISCLOSURE

This disclosure generally relates to software development, and more particularly, to a software forecasting system that may be used with a software development project.

BACKGROUND OF THE DISCLOSURE

The development of complex software may encounter the efforts of numerous personnel and may take some period of time to complete. To maintain these efforts within defined business constraints, forecasts of projected costs and schedule may be generated prior to or during a software development project. Tools that provide forecasts for software development projects are generally referred to as software cost estimation tools. These tools use various attributes associated with the software development project to derive various software development metrics for managing its operation.

SUMMARY OF THE DISCLOSURE

According to one embodiment, a software forecasting system includes a software forecasting tool coupled to a user interface and a software cost estimation tool. The software forecasting tool generates a software development metric according to attributes derived from one or more previous software development projects. The software forecasting tool receives a similar software development metric from the software cost estimation tool and calculates a difference between the received metric and that of its own and displays the result on the user interface.

Some embodiments of the disclosure may provide numerous technical advantages. For example, one embodiment of the software forecasting system may provide relatively greater accuracy than known software cost estimation tools when used alone. The software forecasting system may use attributes from previous software development projects to derive software development metrics for a current software development project. One or more of these software development metrics may be compared with one or more similar software development metrics generated by the software cost estimation tool. In this manner, results provided by each may be validated against one another to derive an accuracy and/or confidence level that may be relatively difficult to obtain by use of the software cost estimation tool by itself.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

As previously described, software cost estimation tools generate various software development metrics for use in managing software development projects. One example of a software cost estimation tool is a commercial off-the-shelf (COTS) software product referred to as the COCOMO (constructive cost model) software package developed by Barry Boehm of the University of Southern California. The COCOMO software package receives a number of attributes indicative of various aspects of an upcoming software development project and generates an effort multiplier value indicating an overall effectiveness or efficiency of the organization. From this effort multiplier value, other development metrics, such as rework hours per defect, system integration defects per thousand equivalent lines of code (KESLOC), and/or inspection effort and efficiency may be derived. Attributes used by the COCOMO software package to compute the effort multiplier value, however, are generally subjective in nature and thus prone to error. Error in these software development metrics may reduce confidence in their viability and/or hinder proper financial forecasting for the software development project.

Figure 1:
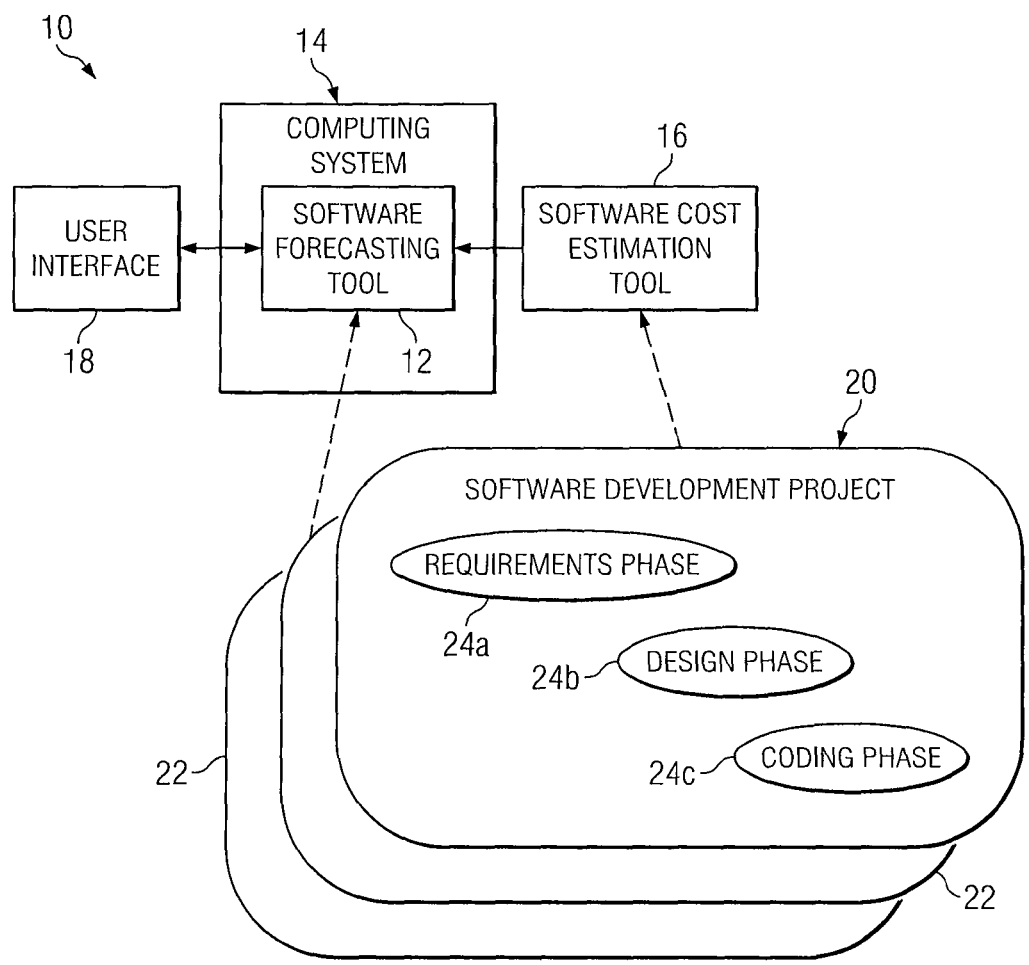
FIG. 1 is a block diagram showing one embodiment of a software forecasting system according to the teachings of the present disclosure that may be used to generate software development metrics for a software development project.

FIG. 1 shows one embodiment of a software forecasting system 10 that may provide a solution to this problem as well as other problems. Software forecasting system 10 generally includes a software forecasting tool 12 in communication with a software cost estimation tool 16 and a user interface 18 as shown. Software cost estimation tool 16 receives a number of attributes associated with a software development project 20 and generates one or more software development metrics for the software development project 20. Software forecasting tool 12 generates similar software development metrics using attributes from one or more previous software development projects 22. Accordingly, software forecasting tool 12 compares similar software development metrics derived by itself with those generated by software cost estimation tool 16 and displays these results on user interface 18.

Certain embodiments of the present disclosure may provide enhanced confidence and/or accuracy in derived software development metrics that may be generated for software development project 20. For example, software forecasting tool 12 may validate results generated by software cost estimation tool 16 by issuing a warning if a software development metric deviates significantly from a similar software development metric calculated in a different manner. Users of software forecasting system 10, therefore, may be provided with a warning if estimated attributes exceed acceptable bounds. As another example, similar software development metrics generated in a different manner may enhance confidence in the obtained results.

Software development project 20 may comprise any project in which a software product is developed for execution on a computing system. For example, a particular software development project 20 may involve the development of software that performs one or more useful functions when executed on a personal computer. Software development project 20 and previous software development projects 22 may each include a requirements phase 24a, a design phase 24b, and/or a coding phase 24c. Requirements phase 24a may include establishing a set of requirements that define the operation of the software on its respective computing system. Design phase 24b may include the development of one or more coding designs that are to be applied during the coding phase 24c. For instance, coding design phase 24b for a particular software development project 20 may include the generation of unified modeling language (UML) models that define how the code is to be structured. Coding phase 24c may include the actual development of the software product according to requirements generated in requirements phase 24a and coding designs developed in design phase 24b.

Each phase 24 of software development project 20 may have attributes that are used by software forecasting tool 12 to generate a predictive analysis for software development project 20. Attributes may include product attributes, hardware attributes, personnel attributes, and/or project attributes. Product attributes may include a required software reliability, a size of application database, and a complexity of the product. Hardware attributes may include run-time performance constraints, memory constraints, a volatility of the virtual machine environment, and a required turnabout time. Personnel attributes may include analyst capability, software engineering capability, applications experience, virtual machine experience, and programming language experience. Project attributes may include use of software tools, application of software engineering methods, and required development schedule.

Software cost estimation tool 16 uses attributes to generate an effort multiplier value from attributes associated with upcoming software development project 20. From this effort multiplier value, other attributes of software development project 20 may be determined. Software cost estimation tool 16 may comprise a suitable commercial off-the-shelf (COTS) software product, such as the COCOMO (constructive cost model) software package developed by Barry Boehm, or a SEER-SEM (System Evaluation and Estimation of Resources) software package supported and distributed by Galorath Incorporated of El Segundo, Calif. Software cost estimation tools such as these generate various software development metrics that may be useful for managing one or more aspects of software development project 20.

According to the teachings of the present disclosure, software forecasting tool 12 performs a predictive analysis from attributes of one or more previous software development projects 22 to generate software development metrics. The generated software development metrics may be combined with similar software development metrics generated by software cost estimation tool 16. As will be described in detail below, difference values may be determined for similar software development metrics generated by software cost estimation tool 16 and software forecasting tool 12. These difference values may be used to validate the software development metrics, enhance their accuracy, and/or generate itemized financial costs associated with software development project 20.

In one embodiment, the difference in generated results may include validation of results produced by software cost estimation tool 16. Software forecasting tool 12 may include upper and lower threshold limits for particular results of predictive analyses that, when compared with the results generated by software cost estimation tool 16, issue a warning if results generated by software cost estimation tool 16 exceed the specified upper or lower threshold limits. For example, software forecasting tool 12 may perform a predictive analysis to estimate the total number of software defects that may be found during software development project 20. Upper and lower threshold limits may be generated at 25 percent above and 25 percent below, respectively, the estimated value. Software forecasting tool 12 receives results for the total number of software defects from software cost estimation tool 16 and issues an alarm if results generated by software cost estimation tool 16 deviates from software forecasting tool's 12 results by more than 25 percent. In a particular embodiment in which predictive analyses are performed immediately following entry of attributes into software cost estimation tool 16, software forecasting tool 12 may be configured to disallow entry of the entered attribute value if the results generated thereby deviate by more than 25 percent from results generated by software forecasting tool 12.

In one embodiment, the difference in generated results may include one or more deviation values that are a combination of results generated by software cost estimation tool 16 and software forecasting tool 12. In some embodiments, the derived deviation values may provide an enhanced accuracy over results generated individually by either software cost estimation tool 16 or software forecasting tool 12. A relatively large deviation value may indicate that either software cost estimation tool 16 and/or software forecasting tool 12 are generating relatively inaccurate results. Conversely, a relatively small deviation value may indicate that software cost estimation tool 16 and software forecasting tool 12 are generating relatively accurate results. Deviation values may include an average or a mean value of results generated by software cost estimation tool 16 and software forecasting tool 12. In another embodiment, deviation values may comprise statistical deviation values that may include, for example, a standard deviation ($\sigma$) of multiple results generated by software cost estimation tool 16 and software forecasting tool 12.

Software forecasting tool 12 may be executed on any suitable computing system 14 that may be, for example, a network coupled computing system or a stand-alone computing system. The stand-alone computing system may be any suitable computing system, such as a personal computer, laptop computer, or mainframe computer capable of executing instructions necessary to implement software forecasting tool 12 according to the teachings of the present disclosure. The network computing system may be a number of computers coupled together via a network, such as a local area network (LAN), a metropolitan area network (MAN), or a wide area network (WAN). A network computing system may enable user interface 14 configured on one computing system to access the software forecasting tool 12 implemented on another computing system.

User interface 18 receives attributes associated with a software development project 20 from a user of software forecasting system 12. User interface 18 may include one or more input devices, such as a keyboard and/or a mouse for inputting attributes and a display, such as a cathode ray tube (CRT) or liquid crystal display (LCD) for view of entered attributes.

Figure 2:
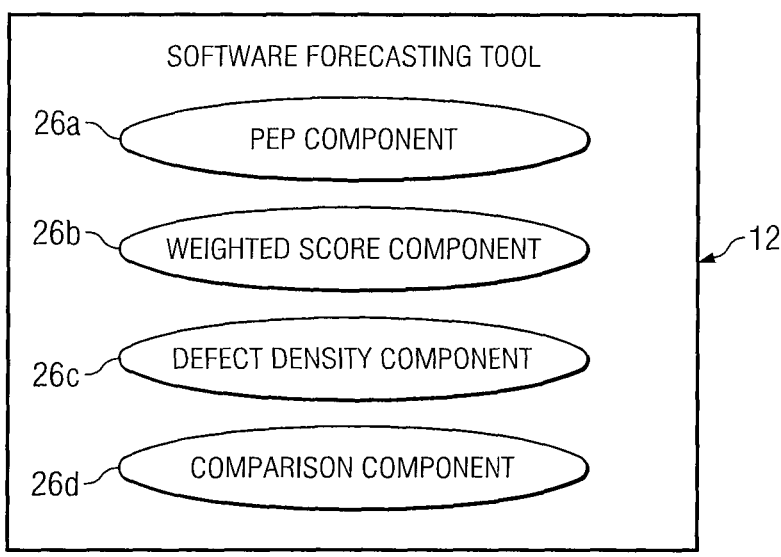
FIG. 2 is a block diagram showing several components of the software forecasting tool of FIG. 1.

FIG. 2 is a block diagram showing one embodiment of software forecasting tool 12. Software forecasting tool 12 includes a process, environment, and people (PEP) component 26a, a weighted score component 26b, a defect density component 26c, and a comparison component 26d. Comparison component 26d combines software development metrics derived by software cost estimation tool 16 with that of its own to provide various useful features, such as those described above with reference to FIG. 1. In one embodiment three equations with a fourth optional equation may be executed using attributes associated with previous software development projects 22. PEP component 26a, weighted score component 26b, and defect density component 26c may be used to execute the three equations, one equation for each component. The three equations may be executed in a particular order and the results may be combined to generate the one or more software development metrics.

According to one embodiment of the disclosure, PEP component 26a may generate a numerical score which quantifies a software development project's inherent advantage over other software development projects in general based on process, environment, and people. The equation used by PEP component 26a may be:

$$PEP\_Score = frwkCons\tan t + frwkFactor * \ln(frwkLogCons\tan t + (frwkLogFactor * EM)).$$

The operation ln refers to the natural logarithm mathematical operation. The variables frwkcons tan t, frwkFactor, and frwkLogCons tan t are constants that may be periodically tailored to empirically match the equation to actual results from previous software development projects 22. That is, the values provided for frwkCons tan t, frwkFactor, and/or frwkLogCons tan t may be adjusted to match defects found during one or more previous software development projects 22 using a suitable process, such as a least mean squares (LMS) curve fitting process. In one particular example, frwkCons tan t may be set to −0.027, frwkFactor may be set to −9.41, and frwkLogCons tan t may be set to 1.16. By adjusting frwkCons tan t, frwkFactor, and/or frwkLogCons tan t variables on an ongoing basis over a number of software development projects, software forecasting tool 12 may provide software development metrics for software development project 20 that may be reasonably accurate.

The variable EM may be calculated by PEP component 26a from one or more attributes of software development project 20. For example, the variable EM may be calculated according to one or more attributes indicative of one or more people who have worked on previous software development projects 22. Attributes indicative of people who have worked on previous software development projects 22 may include, for example, a quantitative measurement of the competency and experience of the people working as part of a software development team. The variable EM may also be calculated according to one or more attributes indicative of an environment of the previous software development project 22. Attributes indicative of an environment of previous software development projects may include, for example, a quantitative measurement of the security required by the users of the software and/or other complexities of the software development project. The variable EM may also be calculated according to one or more attributes indicative of one or more processes associated with the previous software development project 22. Attributes indicative of one or more processes may include, for example, a quantitative measurement of the management plan for the software development project.

The equation used by PEP component 26a may comprise a lagging indicator. The lagging indicator within the context of this disclosure may refer to a collected average number of rework hours per defect. Rework refers to the testing phases of software development where defects are resolved by the author, designer, or programmer. For example, if a defect is found in the developed software, the software product is corrected during rework to meet the requirements in the documentation. Because lagging indicators are not collected until later phases of the project, they may be estimated for an ongoing project by directly using or adjusting the lagging indicator collected from a prior, similar project. PEP component 26a may be calculated by collecting the average number of hours required to resolve defects by the particular people working on the software project. For example, the lagging indicator may generally indicate that a particular software development team generally requires four hours to resolve a defect. As another example, the lagging indicator may indicate that a particular software team generally requires 40 hours to resolve a defect. The optional fourth equation indicated above that may be used by PEP component 26a to calculate EM using a lagging indicator may be:

$$EM = femdEM + femfEM * (\epsilon(femExpf * Rwrk\_Hrs\_per\_Defect) + femExpf).$$

The Rwrk_Hrs_per_Defect parameter used by PEP component 26a may refer to the rework hours per defect as described above. The constants used by PEP component 26a may be set according to a calibration process that adjusts the equations to a sample dataset of previous software development projects 22. As more software project data is added to the dataset, the constants may be updated. The variables femdEM, femfEM, and femExpf are constants that may be periodically tailored to empirically match the defect load model to actual results from previous software development projects 22. That is, the values provided for femdEM, femfEM, and/or femExpf may be adjusted to match defects found during one or more previous software development projects 22 using a suitable process as described above. In one particular example, femdEM may be set to 1.68, femfEM may be set to −1.59, and femExpf may be set to −0.11.

According to one embodiment of the disclosure, PEP component 26a may generate as a byproduct of this disclosure, measures that provide a numerical estimation of a software project's inherent advantage over other software projects. These measures are produced either as an EM value or as a lagging indicator (rework hours per defect). These measures may be calculated using the optional fourth equation referred to as the EM equation noted for PEP component 26a, which calculates EM as a function of rework hours per defect, or a derivation of the same equation to calculate rework hours per defect as a function of EM. Both measures are significant project assessment/status measures, which are useful in a variety of project management activities.

According to one embodiment of the disclosure, weighted score component 26b may generate a weighted score for defect removal for all peer review types adjusted by the PEP Score parameter calculated in the first equation by PEP component 26a. The weighted score component 26b predicts the magnitude of defect reduction for peer reviews and includes an adjustment for each type of peer review based on its relative effectiveness. The equation used by weighted score component 26b may be:

$$WeightedScore = fqcode * (CID + fqDesCodeRatio * (DID + RID)) * EXP(fqEff / PEP\_Score).$$

The constants used by weighted score component 26b may be set according to a calibration process that adjusts the equations to a sample dataset of previous software development projects 22. As more software project data is added to the dataset, the constants may be updated. The variables fqCode, fqDesCodeRatio, and fqEff are constants that may be periodically tailored to empirically match the defect load model to actual results from previous software development projects 22. That is, the values provided for fqCode, fqDesCodeRatio, and/or fqEff may be adjusted to match defects found during one or more previous software development projects 22 using a suitable process as described above. In one particular example, fqCode may be set to 0.70, fqDesCodeRatio may be set to 3.30, and fqEff may be set to 6.95.

The variable CID describes a number of code significant defects removed during coding phase 24c of one or more previous software development projects 22. The variable CID may be calculated based on the code significant defects removed normalized by the size of the software development effort. The particular number of code significant defects removed during coding phase 24c may be received by weighted score component 26b as a parameter indicative of one or more code peer reviews.

The variable DID describes a number of design significant defects removed during design phase 24b of the one or more previous software development projects 22. The variable DID may be calculated based on the design significant defects removed normalized by the size of the software development effort. The particular number of design significant defects removed may be received by weighted score component 26b as a parameter indicative of one or more design peer reviews.

The variable RID describes a number of requirement significant defects removed during requirements phase 24a of the one or more previous software development projects 22. The variable RID may be calculated based on the requirement significant defects removed normalized by the size of the software development effort. The particular number of requirement significant defects removed may be received by weighted score component 26b as a parameter indicative of one or more requirement peer reviews.

According to one embodiment of the disclosure, defect density component 26c may generate the defect density from the weighted score calculated by weighted score component 26b. The equation used by defect density component 26c may be:

$$DefectDensity = fq \ln^* \ln(WeightedScore) + fqCons \tan t.$$

The constants used by defect density component 26c may be set according to a calibration process that adjusts the equations to a sample dataset of software projects. As more software project data is added to the dataset, the constants may be updated. The constant fqln may have any suitable value, for example, −2.23. The constant fqConstant may have any suitable value, for example, 6.81.

Software forecasting tool 12 may execute three equations and a fourth optional equation to generate software development metrics using attributes related to software development project 20 and constants that have been determined by analyzing a sample dataset of previous software development projects 22. In one embodiment, software forecasting tool 12 may also provide cost predictions for various aspects of software development project 20. That is, software forecasting tool 12 may provide itemized costs for various aspects of software development project 20. For example, PEP component 26a generates a rework hours per Defect value that may be used by software forecasting tool 12 to derive an itemized cost value due to defects found during software development project 20. Weighted score component 26b generates a weighted score that may be used by software forecasting tool 12 to derive a cost savings due to removal of defects by inspections. Defect density component 26c generates a value that is used by software forecasting tool 12 to determine cost savings provided by the incremental increase or decrease in the number of inspections performed during software development project 20.

Certain embodiments incorporating itemized cost predictions for software development project 20 may provide enhanced prediction of costs and thus control over investment in software development project 20. By providing a predictive analysis in which projected costs are itemized, managers of software development project 20 may apply preventative measures over certain aspects of the software development project 20 to ensure monetary costs may be maintained within acceptable limits. Itemized predictive analysis of certain aspects of software development project 20 may also be used for comparison with other software development projects or with alternative management plans of the present software development project 20 to determine a relative savings that may be applied to software development project 20.

Figure 3:
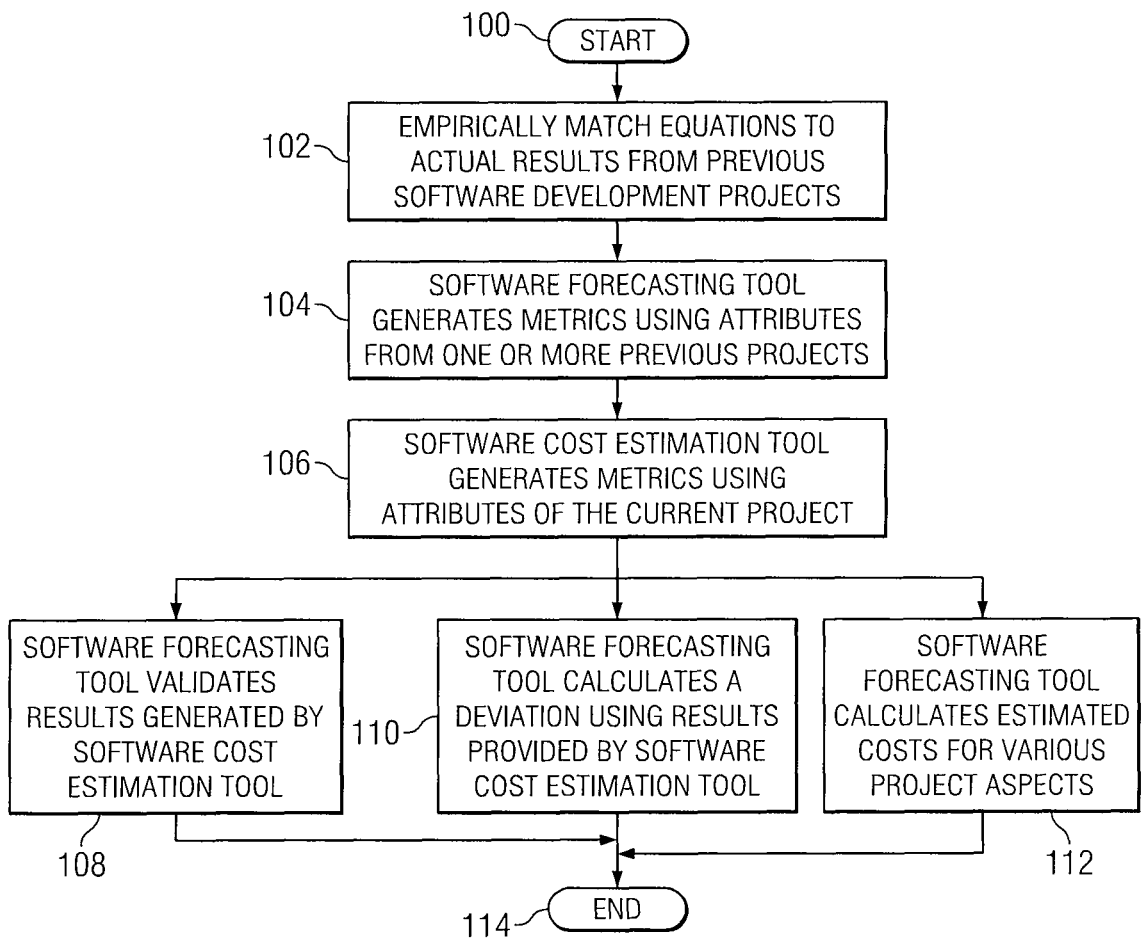
FIG. 3 is a flowchart showing one embodiment of a series of actions that may be performed by the software forecasting system of FIG. 1.

FIG. 3 shows one embodiment of a series of actions that may be performed by software forecasting tool 12 to generate software development metrics and compare the generated software development metrics with results calculated by software cost estimation tool 16. In act 100, the process is initiated.

In act 102, the equations used by PEP component 26a, weighted score component 26b, and defect density component 26c are empirically matched to actual results obtained from one or more previous software development projects 22. Within the context of this disclosure, the term "empirically matched" generally refers to the process of adjusting constant variables of its associated equation in such a manner to minimize deviation of the equation from actual results to an acceptable level. The empirically matched equations may form a baseline from which software development metrics may be calculated from software development project 20.

In act 104, software forecasting tool 12 generates software development metrics using attributes from one or more previous software development projects 22. Software development metrics may include any parametric value normally calculated by software cost estimation tool 16. In one embodiment, software development metrics may include an effort multiplier (EM) value, a rework hours per defect value, a systems integration defects per K equivalent source lines of code, and an inspection effort and proficiency value.

In act 106, software cost estimation tool 16 generates similar software development metrics using attributes from the current software development project 20. In one embodiment, software cost estimation tool 16 may be the COCOMO software package that calculates the previously described software development metrics using attributes inputted through user interface 18. Following execution of acts 104 and 106, either one or all of acts 108 through 112 may be performed by software forecasting tool 12.

In act 108, software forecasting tool 12 validates results generated by software cost estimation tool 16. That is, software forecasting tool 12 may compare its generated value with a similar software development metric generated by software cost estimation tool 16. In one embodiment, software forecasting tool 12 may issue a warning to the user interface 18 if the comparison deviated beyond an acceptable amount. In another embodiment, software forecasting tool 12 may cause software cost estimation tool 16 to reject entry of one or more attributes that resulted in generation of a software development metric that deviates beyond the acceptable amount. For example, entry of attributes used by software cost estimation tool 16 may be provided by a graphical user interface (GUI) window executed on user interface 18. Upon entry of a particular attribute through GUI window, software cost estimation tool 16 calculates a software development metric which is beyond a specified limit from a value calculated by software forecasting tool 12. In this case, software forecasting tool 12 may reject entry of this particular attribute.

In act 110, software forecasting tool 12 may calculate deviation values for results generated by software forecasting tool 12 and software cost estimation tool 16. The deviation values may provide insight into the accuracy of results provided by software forecasting tool 12 and/or software cost estimation tool 16. For example, a relatively large deviation value may indicate correspondingly inaccurate results, while a relatively small deviation value may indicate relatively accurate results.

In act 112, software forecasting tool 12 generates estimated costs for various aspects of software development project 20 based upon the generated software development metrics. The software development metrics may provide an itemized cost value for the overall software development project 20. Using its generated software development metrics with other software development metrics generated by software cost estimation tool 16, software forecasting tool 12 may generate cost estimations for various portions of software development project 20.

In act 114, the process ends.

Modifications, additions, or omissions may be made to the previously described method without departing from the scope of the disclosure. The method may include more, fewer, or other acts. For example, software forecasting tool 12 may compare its results with multiple software cost estimation tools or with other methods that generate software development metrics, such as an analysis effort method, and/or a function point analysis (FPA) method.

Although several embodiments have been illustrated and described in detail, it will be recognized that substitutions and alterations are possible without departing from the spirit and scope of the present disclosure, as defined by the following claims.

What is claimed is:

1. A software forecasting system comprising:
a user interface displayed to a user on a display of a computing system; and
a software forecasting tool executed by a processor of the computing system and operable to:
receive, from a software cost estimation tool, a first software development metric indicative of a particular aspect of a current software development project, the software development metric generated from one or more first attributes associated with the current software development project, wherein the first software development metric comprises a number of rework hours per defect metric, wherein the number of rework hours per defect metric is generated based on a particular software development team that is working on the current software development project;
generate a second software development metric comprising a number of rework hours per defect metric according to one or more second attributes associated with the particular software development team and one or more previous software development projects, the second software development metric indicative of the particular aspect, wherein generating the second software development metric comprises:
calculating, by a process, environment, and people (PEP) component of the software forecasting tool, a first numerical score comprising a lagging indicator indicating a collected average number of rework hours per defect;
calculating, by a weighted score component of the software forecasting tool, a second numerical score comprising a weighted score for defect removal by peer review, wherein the second numerical score is calculated based on the first numerical score; and
calculating, by a defect density component of the software forecasting tool, a third numerical score comprising a defect density of the current software development project, wherein the third numerical score is calculated based on the second numerical score, and wherein the second software development metric is calculated based on the third numerical score;

calculate a difference between the first software development metric and the second software development metric by a comparison component of the software forecasting tool; and
display the difference on the user interface.

2. The software forecasting system of claim 1, wherein the software forecasting tool comprises a defect load model that is empirically matched to an actual curve of the one or more previous software development projects.

3. The software forecasting system of claim 2, wherein the defect load model is based upon a natural logarithmic function.

4. The software forecasting system of claim 1, wherein the particular aspect is a cost prediction of the current software development project, the cost prediction derived according to a quantity of defects incurred by the current software development project.

5. The software forecasting system of claim 1, wherein the particular aspect is a cost prediction of the current software development project, the cost prediction derived according to a quantity of defects removed in response to inspections.

6. The software forecasting system of claim 1, wherein the particular aspect is a cost prediction of the current software development project, the cost prediction derived according to a quantity of inspections.

7. The software forecasting system of claim 1, wherein the software forecasting tool is further operable to display a warning on the user interface indicating that the difference has exceeded a specified boundary.

8. The software forecasting system of claim 1, wherein the software forecasting tool is further operable to calculate a statistical deviation value between the first software development metric and the second software development metric.

9. A computer-implemented method comprising:
receiving, from a software cost estimation tool, a first software development metric indicative of a particular aspect of a current software development project, the software development metric generated from one or more first attributes associated with the current software development project, wherein the first software development metric comprises a number of rework hours per defect metric, wherein the number of rework hours per defect metric is generated based on a particular software development team that is working on the current software development project;
generating a second software development metric comprising a number of rework hours per defect metric according to one or more second attributes associated with the particular software development team and one or more previous software development projects, the second software development metric indicative of the particular aspect, wherein generating the second software development metric comprises:
calculating, by a process, environment, and people (PEP) component of the software forecasting tool, a first numerical score comprising a lagging indicator indicating a collected average number of rework hours per defect;
calculating, by a weighted score component of the software forecasting tool, a second numerical score comprising a weighted score for defect removal by peer review, wherein the second numerical score is calculated based on the first numerical score; and
calculating, by a defect density component of the software forecasting tool, a third numerical score comprising a defect density of the current software development project, wherein the third numerical score is calculated based on the second numerical score, and wherein the second software development metric is calculated based on the third numerical score;

calculating a difference between the first software development metric and the second software development metric by a comparison component of the software forecasting tool; and displaying the difference on a user interface.

10. The method of claim 9, further comprising empirically matching a defect load model of the software forecasting tool to an actual curve of the one or more previous software development projects.

11. The method of claim 10, wherein empirically matching the defect load model of the software forecasting tool further comprises empirically matching the defect load model that is based upon a natural logarithmic function.

12. The method of claim 9, wherein generating the second software development metric further comprises generating the second software development metric comprising a cost prediction of the current software development project, the cost prediction derived according to a quantity of defects incurred by the current software development project.

13. The method of claim 9, wherein generating the second software development metric further comprises generating the second software development metric comprising a cost prediction of the current software development project, the cost prediction derived according to a quantity of defects removed in response to inspections.

14. The method of claim 9, wherein generating the second software development metric further comprises generating the second software development metric comprising a cost prediction of the current software a development project, the cost prediction derived according to a quantity of inspections.

15. The method of claim 9, wherein displaying the difference further comprises displaying a warning on the user interface, the warning indicating that the difference has exceeded a specified boundary.

16. The method of claim 9, wherein calculating a difference further comprises calculating a statistical deviation value between the first software development metric and the second software development metric.

17. A non-transitory computer program product comprising a non-transitory computer readable storage medium containing computer code that, when executed by a computer, implements a method for software forecasting, wherein the method comprises:

receiving, from a software cost estimation tool, a first software development metric indicative of a particular aspect of a current software development project, the software development metric generated from one or more first attributes associated with the current software development project, wherein the first software development metric comprises a number of rework hours per defect metric, wherein the number of rework hours per defect metric is generated based on a particular software development team that is working on the current software development project;

generating a second software development metric comprising a number of rework hours per defect metric according to one or more second attributes associated with the particular software development team and one or more previous software development projects, the second software development metric indicative of the particular aspect, wherein generating the second software development metric comprises:

calculating, by a process, environment, and people (PEP) component of the software forecasting tool, a first numerical score comprising a lagging indicator indicating a collected average number of rework hours per defect;

calculating, by a weighted score component of the software forecasting tool, a second numerical score comprising a weighted score for defect removal by peer review, wherein the second numerical score is calculated based on the first numerical score; and calculating, by a defect density component of the software forecasting tool, a third numerical score comprising a defect density of the current software development project, wherein the third numerical score is calculated based on the second numerical score, and wherein the second software development metric is calculated based on the third numerical score;

calculating a difference between the first software development metric and the second software development metric by a comparison component of the software forecasting tool; and displaying the difference on a user interface.

* * * * *